July 22, 1952  E. L. OLSEN  2,604,272
FISHING REEL

Filed May 16, 1947 3 Sheets-Sheet 1

INVENTOR.
Elmer L. Olsen
BY Victor J. Evans & Co.
ATTORNEYS

July 22, 1952 E. L. OLSEN 2,604,272
FISHING REEL

Filed May 16, 1947 3 Sheets-Sheet 2

INVENTOR.
Elmer L. Olsen
BY Victor J. Evans & Co.
ATTORNEYS

INVENTOR.
Elmer L. Olsen

Patented July 22, 1952

2,604,272

UNITED STATES PATENT OFFICE 2,604,272

FISHING REEL

Elmer L. Olsen, Penney Farms, Fla.

Application May 16, 1947, Serial No. 748,384

2 Claims. (Cl. 242—84.1)

This invention relates to fishing reels.

It is an object of the present invention to provide a fishing reel which can be angularly adjusted to pay off fish line over the end of the spool and then adjusted to a position where the spool axis extends transversely to the rod for the purpose of reeling in the line.

Other objects of the present invention are to provide a pay off type of reel with a simple mechanism for effecting the rotation of the reel and the angular adjustment of the reel so that the line may be extended outwardly over the end of the spool, with a simple catch or release device for retaining the spool in its line return position, a reel which is inexpensive to manufacture and efficient in operation.

For other objects and for a better understanding of the invention, reference may be had to the following detailed description taken in connection with the accompanying drawing, in which Fig. 1 is a side elevational view of a fish rod and a reel embodying the features of the present invention.

Figure 1:
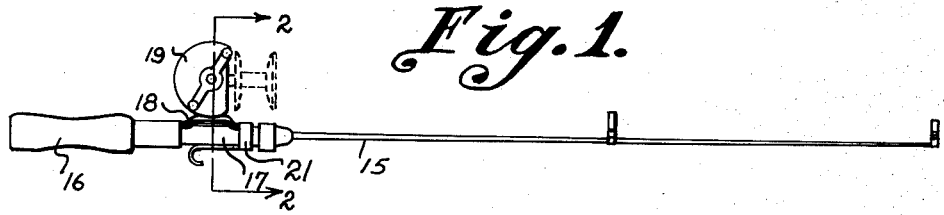
Figure 2:
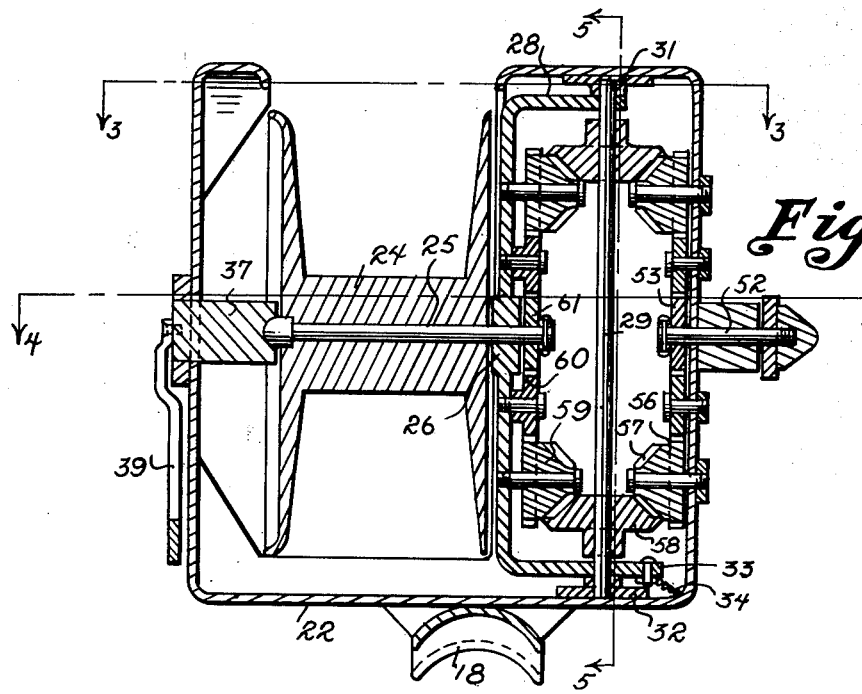
Fig. 2 is an enlarged transverse cross-sectional view taken on line 2—2 of Fig. 1.
Figure 3:
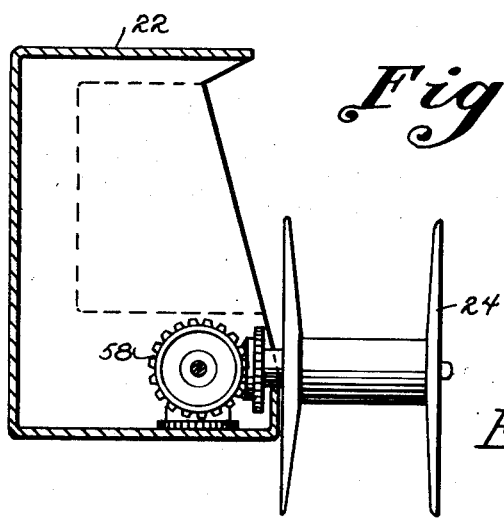
Fig. 3 is a cross-sectional view taken on line 3—3 of Fig. 2.

Referring now to the figures, 15 represents a fish rod having a handle 16 thereon and a portion 17 on which is fitted an attaching plate 18 of a reel 19 embodying the features of the present invention. The attaching plate is secured over the portion 17 in the usual manner by adjusting an internally threaded sleeve 21 along the portion 17 and extending over one end of the attaching plate 18.

Figure 4:
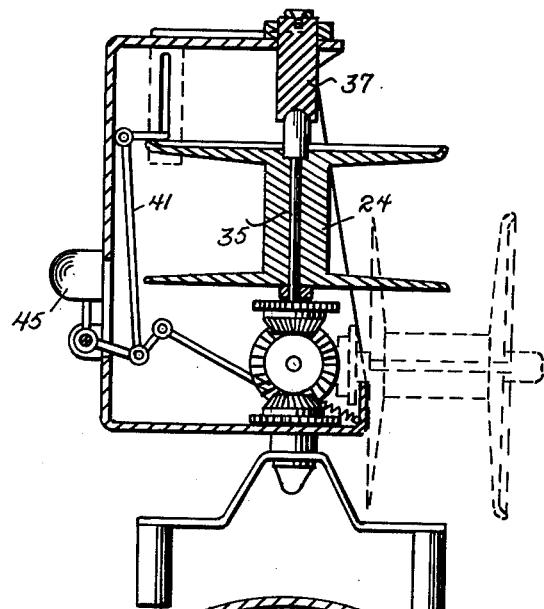
Fig. 4 is a cross-sectional view taken on line 4—4 of Fig. 3.
Figure 5:
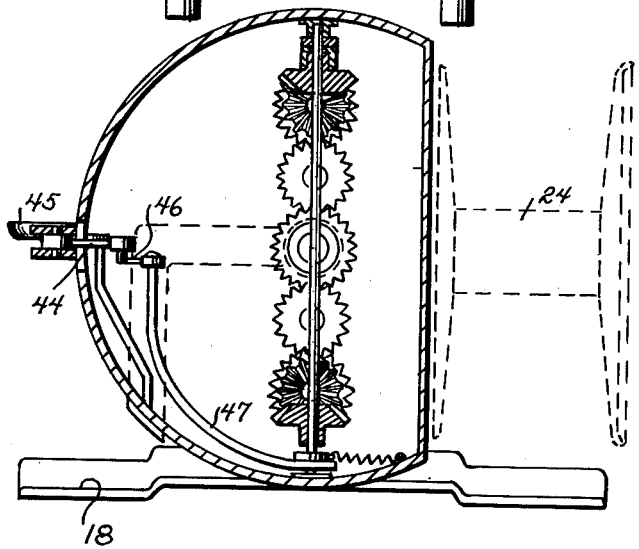
Fig. 5 is a cross-sectional view, in elevation, taken through the driving mechanism and on line 5—5 of Fig. 2.
Figure 6:
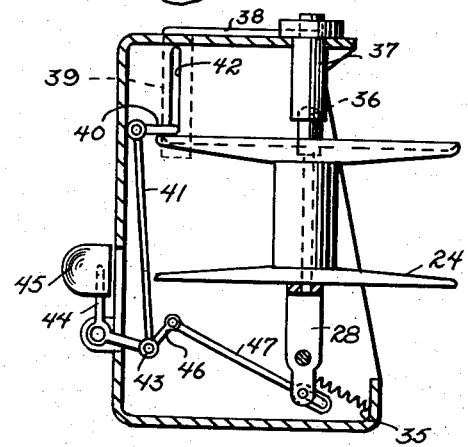
Figs. 6, 7 and 8 are respectively cross-sectional and illustrative views showing the spool in its transverse position with the catch retaining the same, the spool after it has been released and the spool after it has been released and extended so that the line can be taken off the end of the spool.
Figure 8:
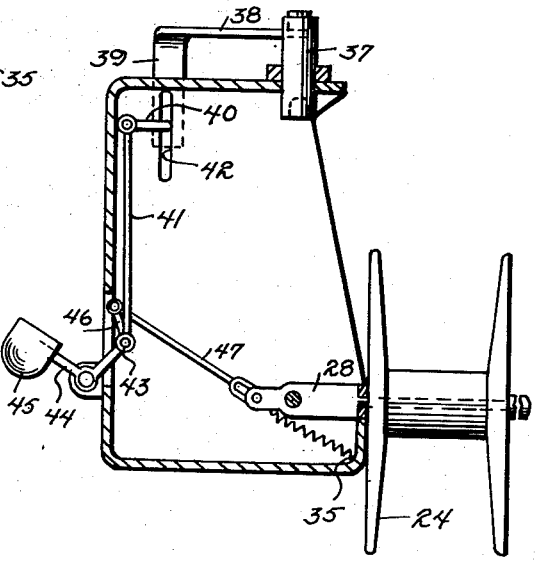
Figure 7:
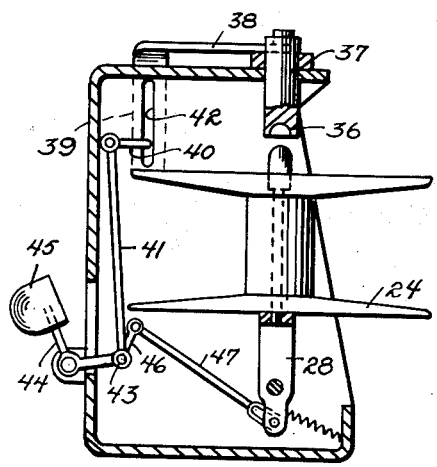

The reel 19 further includes a casing 22 open at the front end to permit the extension of a spool 24 to a position whereby the line can be reeled off the end of the spool. The spool 24 is fixed to a shaft 25 journalled in a swivel bracket 26 having inwardly extending portions 28 at the upper and lower ends of the same pivoted upon a vertically extending shaft 29 carried in bearing brackets 31 and 32 at the top and bottom of the casing 22. The lower arm of the swivel bracket 28 has an extension 33 to which is connected a return spring 34 anchored to the casing as indicated at 35. This spring is of sufficient tension to automatically return the spool to its transverse position upon the tension being taken from the line but at times when the line is being payed out the tension of the line is sufficient to cause the pivotal adjustment of the spool about the shaft 29 so that the spool is extended to the dotted line position shown in Figs. 1, 4 and 5.

Normally the spool is retained by a projection of shaft 25 into a recess 36 on a member 37 which is adjustable in and out of the end of the casing 22. The member has an external arm 38 which has a projection 39 thereon extending laterally inwardly and to which an arm 40 of a bell crank lever 41 is connected. The arm 40 is bent to extend through a slot 42 for connection with the inwardly extending projection 39. The bell crank 41 lies within the casing and is connected as indicated at 43 with an operating lever 44 having a finger or thumb piece 45 thereon. The operating lever 44 also has an extension 46 which is connected by a link 47 with the extension 33 of the swivel bracket whereby as the member 37 is released from the end of the shaft 25 the swivel bracket and the spool thereon will be simultaneously and automatically swung about and forwardly of the casing. As long as the operating lever 44 is retained either by the tension on the line or by the thumb and finger pulling upon the piece 45, line will be extended.

On the opposite end of the casing from the release member 37 is a crank 51 which turns a shaft 52 and a gear 53 meshing with planet gears 54. The gears 54 are journalled on stub shafts 55 and in turn the gears 54 mesh with gears 56 having bevel gear teeth 57 thereon. The bevel gear teeth mesh with a spacer bevel gear 58 to mesh with gears 59, 60 and 61 carried on the swivel bracket 28. The gear 61 is fixed to the spool shaft 25.

Accordingly there has been provided a driving mechanism which is adapted to permit the turning movement of the swivel bracket 28 and wherein the gears will stay in mesh so that the spool can be turned even though the spool has been angled to the position where line is payed out.

I claim:

1. In a fishing reel, an open ended casing adapted to be secured to a fishing rod, a swivel bracket arranged in said casing and pivotally connected thereto, a line carrying spool connected to said bracket and mounted for movement into and out of said casing, means for rotating said spool, an adjustable member carried by said casing having contact with said spool for maintaining said spool in said casing, manually operated linkage means connected to said spool for maintaining said spool out of said casing, resilient means for normally urging said spool into said casing, release means coacting with said adjustable member and said linkage for permitting movement of said spool out of said casing, and release of said release means permitting said resilient means to move said spool in said casing.

2. In a fishing reel, an open ended casing adapted to be secured to a rod, a swivel bracket arranged in said casing and pivotally connected thereto, a line carrying spool connected to said swivel bracket and mounted for movement into and out of said casing, means embodying intermeshing gears for rotating said spool, an adjustable member carried by said casing having contact with said spool for maintaining said spool in said casing, manually operated linkage means connected to said spool for maintaining said spool out of said casing, resilient means embodying a return spring for normally urging said spool into said casing, release means coacting with said adjustable member and said linkage for permitting movement of said spool out of said casing, and release of said release means permitting said resilient means to move said spool into said casing.

ELMER L. OLSEN.

REFERENCES CITED

The following references are of record in the file of this patent:

UNITED STATES PATENTS

| Number | Name | Date |
|---|---|---|
| 744,454 | Allen | Nov. 17, 1903 |
| 2,299,156 | Lind | Oct. 20, 1942 |
| 2,512,170 | Oen | June 20, 1950 |

FOREIGN PATENTS

| Number | Country | Date |
|---|---|---|
| 211,406 | Great Britain | Feb. 21, 1924 |
| 649,232 | France | Aug. 27, 1928 |